United States Patent [19]
Matsuoka et al.

[11] Patent Number: 4,824,479
[45] Date of Patent: Apr. 25, 1989

[54] METHOD FOR PRODUCING A CARBONACEOUS SOLID REDUCTANT FOR DIRECT REDUCTION OF IRON ORE

[75] Inventors: Toshio Matsuoka, Niihama; Seiji Sugimori, Saijo; Yukio Koyabu; Shinichi Kurozu, both of Niihama, all of Japan

[73] Assignee: Sumitomo Heavy Industries, Ltd., Tokyo, Japan

[21] Appl. No.: 188,628

[22] Filed: Apr. 29, 1988

Related U.S. Application Data

[63] Continuation of Ser. No. 735,292, May 17, 1985, abandoned, which is a continuation of Ser. No. 538,882, Oct. 4, 1983, abandoned.

[30] Foreign Application Priority Data

Oct. 12, 1982 [JP] Japan ................................. 57-178735

[51] Int. Cl.$^4$ ............................................. C21B 13/00
[52] U.S. Cl. ....................................... 75/0.5 R; 75/33; 75/257
[58] Field of Search .......................... 75/0.5 R, 33, 257

[56] References Cited

U.S. PATENT DOCUMENTS 4,015,977 4/1977 Crawford ................................. 75/3

Primary Examiner—Melvyn J. Andrews
Attorney, Agent, or Firm—Armstrong, Nikaido, Marmelstein & Kubovcik

[57] ABSTRACT

In a method for producing a reactivity promoted carbonaceous solid reductant used for direct reduction of iron ore by means of an additional alkaline earth metal compound, and improved method wherein the improvement comprises grinding and mixing the carbonaceous solid reductant with the alkaline earth metal compound and agglomerating the resulting mixture to produce the reactivity promoted carbonaceous solid reductant of a definite grain size.

5 Claims, 4 Drawing Sheets

METHOD FOR PRODUCING A CARBONACEOUS SOLID REDUCTANT FOR DIRECT REDUCTION OF IRON ORE

This application is a continuation of application Ser. No. 735,292, filed May 17, 1985, now abandoned, which in turn is a continuation of Ser. No. 538,882, filed Oct. 4, 1983, now abandoned.

The present invention relates to an improved method for producing a reactivity promoted carbonaceous solid reductant used for direct reduction of iron ore which comprises grinding and mixing the carbonaceous solid reductant with an alkaline earth metal compound and agglomerating the resulting mixture to produce the reactivity promoted carbonaceous solid reductant of a definite grain size.

Petroleum coke is used as a carbonaceous solid reductant in the direct reduction of iron ore for the reason that carbon monoxide gas produced by the so-called Boudouard reaction ($C+CO_2 \rightarrow 2CO$) is used as a reductant. The reaction rate of the Boudouard reaction varies with the kind of carbon sources used, and the result of the reactivity test according to JIS K-2151 shows that petroleum coke is not superior to coal. However, petroleum coke does have an advantage over coal in that it contains little ash. It is therefore certain that petroleum coke can be a far more favorable reductant than coal if only the above reactivity is improved.

For this purpose, various studies have been made, and for example, with consideration given to alkaline earth metal compounds, a method to improve the reactivity of petroleum coke by incorporating said compounds or impregnating with said compounds was proposed (Japanese Patent Application Kokai (Laid-Open) No. 101190/1983 and Japanese Patent Application No. 113860/1982).

The present invention also makes use of alkaline earth metal compounds, and it provides a method to produce the reductant by grinding petroleum coke and an alkaline earth metal compound, mixing the both at a required mixing ratio and agglomerating the resulting mixture to grain size. According to the present invention, not only improvement in the reactivity but also selection of the making ratio of the alkaline earth metal compound sufficient to reduce the generation of gaseous sulfur compounds can be accomplished with ease.

Explanation will be given hereinbelow with reference to one example embodying the present invention.

Figure 1:
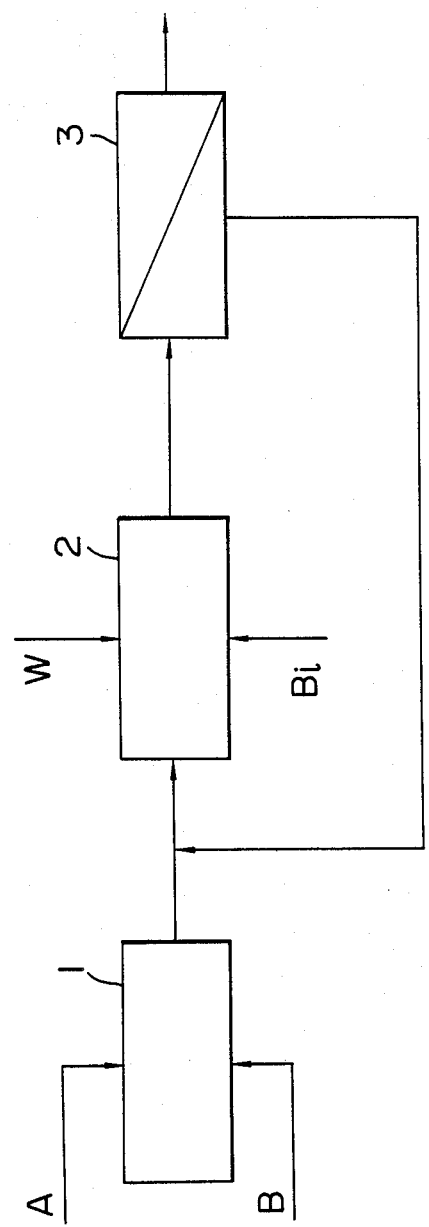
FIG. 1 illustrates in diagramatic form the preferred steps for accomplishing the method for producing a reactivity promoted carbonaceous solid reductant of the present invention.

In FIG. 1, petroleum coke A and an alkaline earth metal compound B are sent to a grinding/mixing apparatus 1 wherein the both are ground to a grain size suitable for agglomerating and at the same time mixed at a required mixing ratio, and the resulting mixture is then sent to an agglomerating apparatus 2. In the apparatus 2, said mixture is agglomerated to grain size of 1 mm or more and sent to a screen 3 from which agglomerates having a grain size of 1 mm or more are charged to a reduction furnace as a product and those having grain size of less than 1 mm are returned to the agglomerating apparatus 2. As the agglomerating apparatus 2, any of pelletizers, extruders and briquetting machines may be used, and water W and a binder Bi may be added as the case may be. In addition, the agglomerating apparatus 2 is sometimes heated for facilitating agglomeration.

The following is a reactivity test of agglomerates according to the present invention.

Test example (1)

(1) Agglomerating condition
(a) Material
Petroleum coke (grain size, 1 mm minus)

|  | Total carbon | Sulfur | Fixed carbon | Volatile matter | Ash |
|---|---|---|---|---|---|
| Wt (%) | 90.0 | 4.64 | 85.9 | 14.0 | 0.1 |

Limestone (grain size, 0.25 mm minus)

|  | CaO | MgO | $Al_2O_3$ + $SiO_2$ | Loss on ignition |
|---|---|---|---|---|
| Wt (%) | 55.31 | 0.97 | 0.2 | 43.53 |

Quick lime (grain size, 0.25 mm minus)

|  | CaO | MgO | $Al_2O_3$ + $SiO_2$ | Loss on ignition |
|---|---|---|---|---|
| Wt (%) | 97.5 | — | 0.3 | 1.0 |

(b) Agglomerating condition
(i) Agglomerating apparatus extruder
(ii) Agglomerating condition
Added water 10 wt(%) (based on dry coke)
Mixing condition (weight ratio)
dry coke/limestone = 100/13.32
dry coke/quick lime = 100/7.56
No binder
(2) Product
(a) Calcium content (dry basis)

|  | Ca wt (%) |
|---|---|
| Petroleum coke + limestone | 4.25 |
| Petroleum coke + quick lime | 3.52 |

(b) Grain size 3 mm or more

Test example (2)

(1) Agglomerating condition
(a) Material
Petroleum coke (grain size, 0.5 mm minus)

|  | Total carbon | Sulfur | Fixed carbon | Volatile matter | Ash |
|---|---|---|---|---|---|
| Wt (%) | 91.9 | 3.95 | 83.48 | 15.78 | 0.74 |

Barium Hydroxide, Ba(OH)$_2$.8H$_2$O—Reagent

|  | Barium hydroide | Carbonate (as BaCO$_3$) | Iron |
|---|---|---|---|
| Wt (%) | >97 | 3> | 0.001> |

Dolomite (grain size, 0.25 mm minus)

|  | CaO | MgO | Al$_2$O$_3$ + SiO$_2$ | Loss on ignition |
|---|---|---|---|---|
| Wt (%) | 36.51 | 14.97 | 0.47 | 46.42 |

(b) Agglomerating condition
(i) Agglomerating apparatus extruder
(ii) Agglomerating condition
Added water 15 wt(%) (based on dry coke)
Mixing condition
Dry coke/Barium hydroxide=100/5.0
Dry coke/Dolomite=100/11.4
No binder
(2) Product
(a) Chemical analysis (dry basis)

| Petroleum coke + Barium hydroxide | 2.60 wt. % Ba |
| Petroleum coke + Dolomite | 2.69 wt. % Ca |
|  | 1.17 wt. % Mg |

(b) Grain size 3 mm or more

Figure 2:
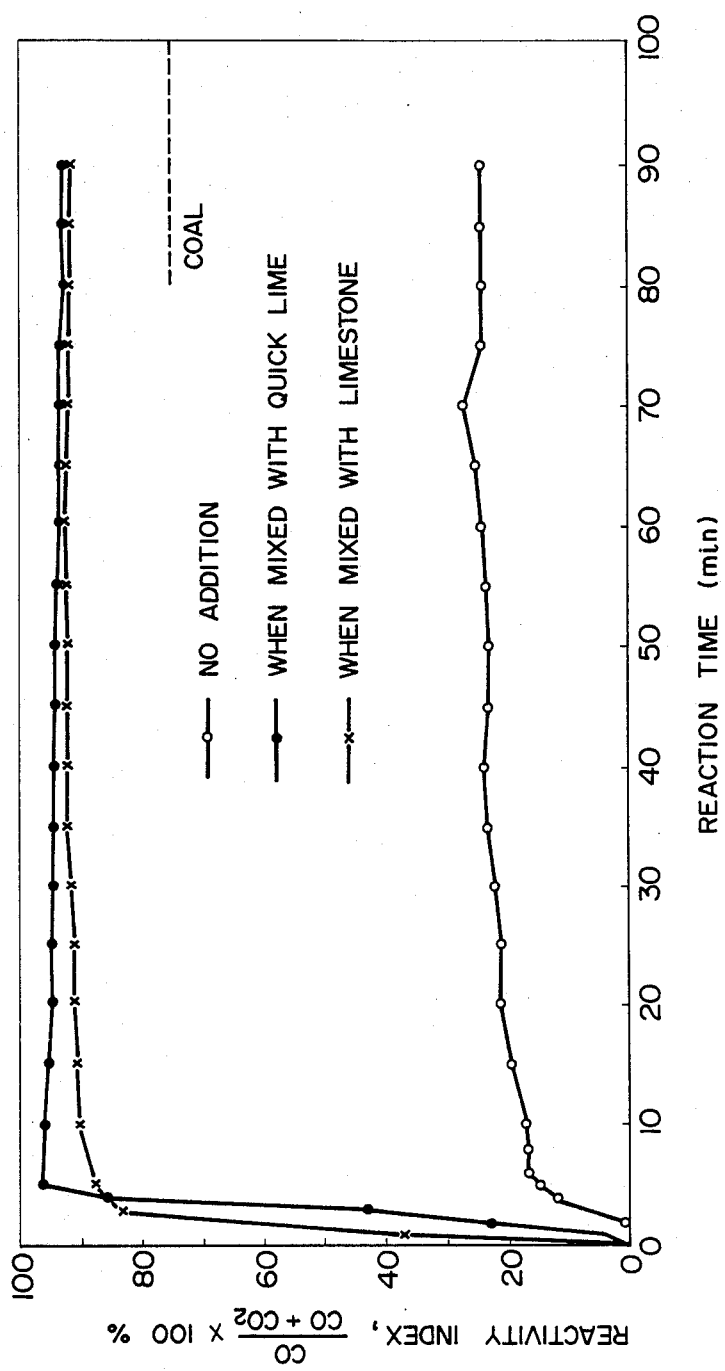
FIG. 2 illustrates the results, in graph form, of reactivity tests for a reductant produced according to the conditions described in Test Example 1 as described below.
Figure 3:
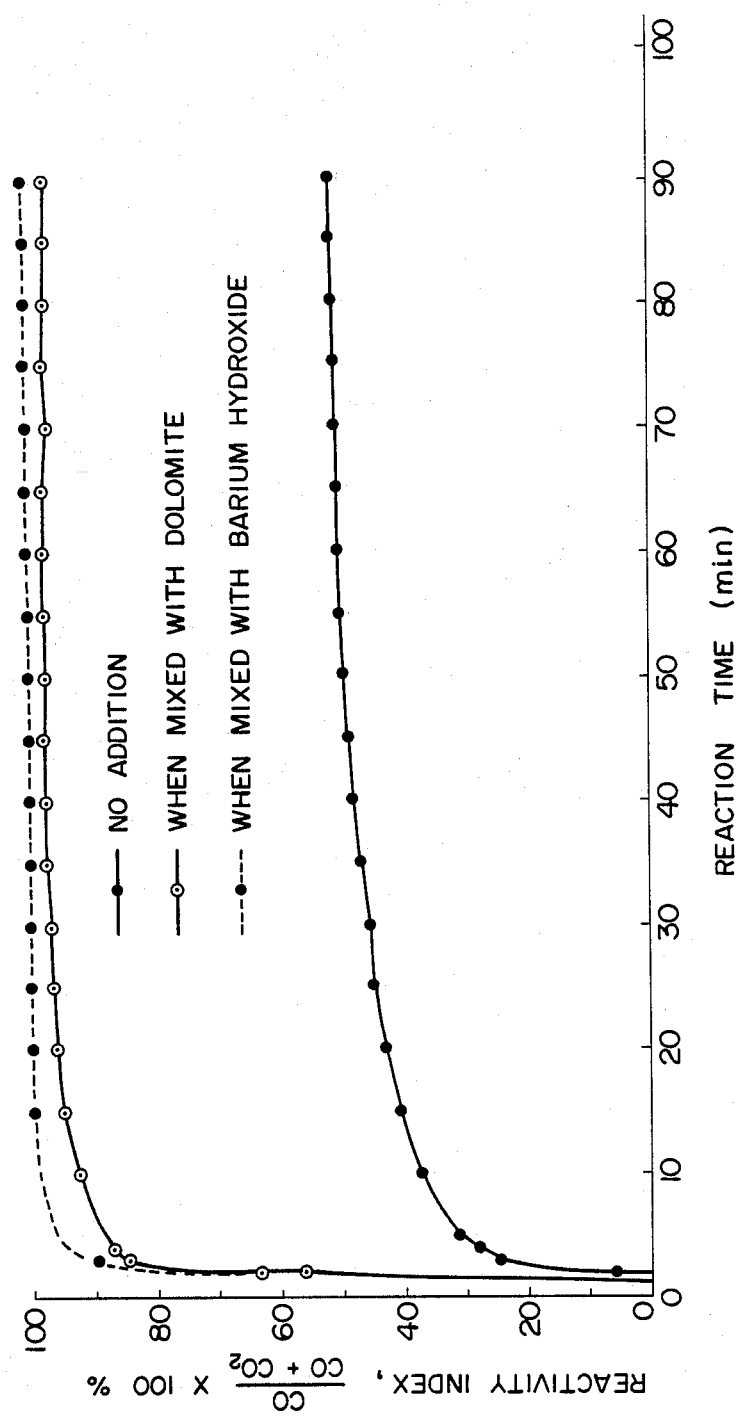
FIG. 3 illustrates the results, in graph form, of reactivity tests for a reductant produced under the conditions described in Test Example 2 discussed below.

The results of reactivity tests for a reductant produced under the foregoing conditions are shown in FIG. 2 and FIG. 3. FIG. 2 and FIG. 3 are a graphs illustrating the results of the reactivity tests, and the reactivity of reductant referred to herein means reactivity with carbon dioxide in the Boudouard reaction. The reactivity tests were carried out according to JIS K-2151, and the reactivity index is expressed by the following equation:

$$\text{Reactivity index} = \frac{CO}{CO + CO_2} \times 100 \text{ (mole \%)}$$

As apparent from these graphs, the reactivity of petroleum coke is remarkably improved by adding limestone, quick lime, dolomite or barium hydroxide to the coke. As illustrated in FIGS. 2 and 3, a reactivity index of above 80% may be achieved according to the present invention after a few minutes of reaction time.

Figure 4:
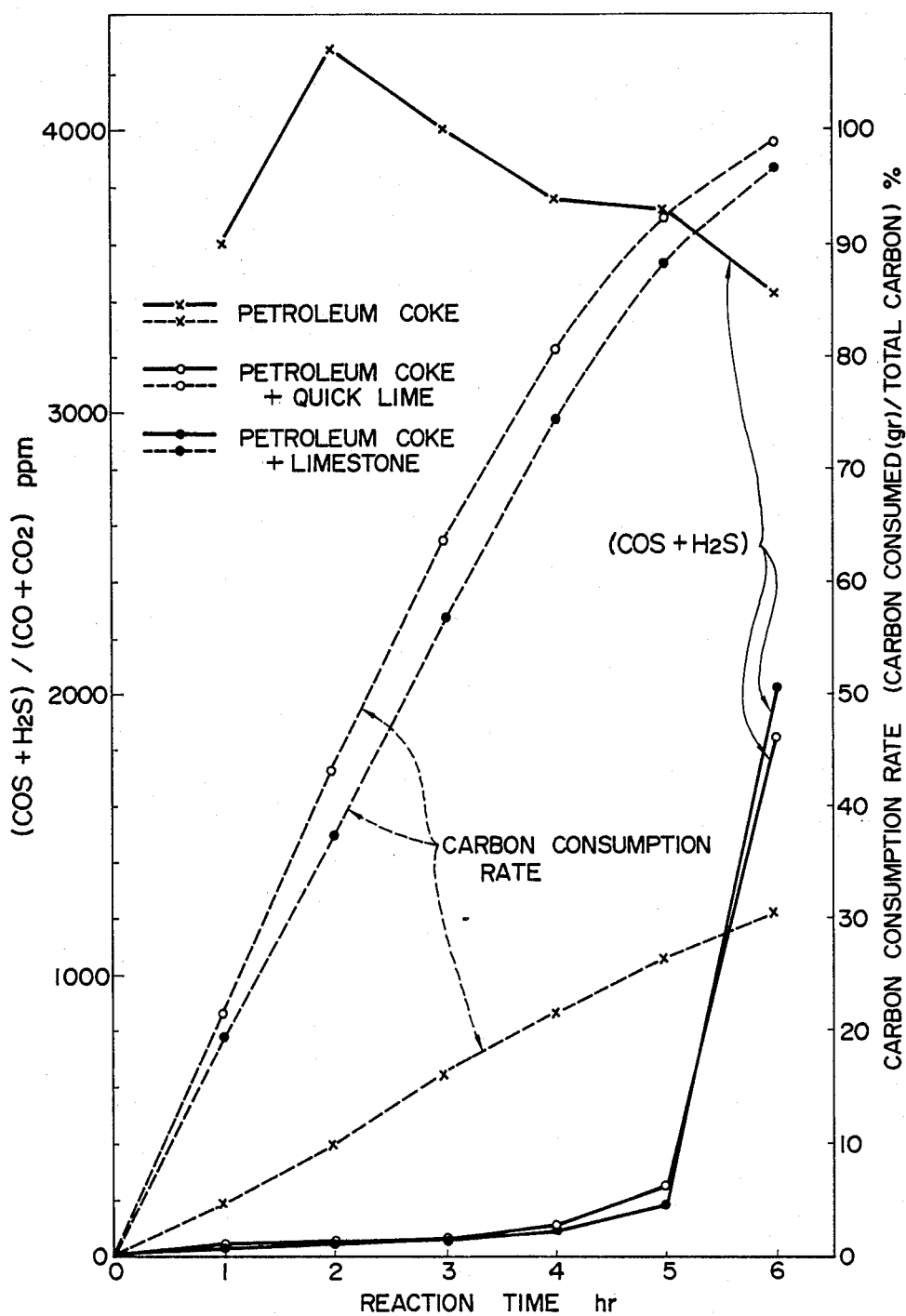
FIG. 4 illustrates, in graph form, the marked reduction in the formation of gaseous sulfur compounds based upon the addition of a Ca compound to coke.

Further, in the present invention, the generation of gaseous sulfur compounds can be inhibited by adding a Ca compound to the coke. The test result thereof is shown in FIG. 4. In this test, sulfur compounds (H$_2$S+COS) in the exhaust gas from the foregoing reactivity test were detected. As apparent from this figure, it is seen that the formation of gaseous sulfur compounds is remarkably reduced.

By increase in the reactivity of the reductant, operation of the reduction furnace at low temperatures becomes possible, and besides, by reduction of gaseous sulfur compounds, exhaust gas treatment of the process becomes easy.

As described above, the present invention has advantages that a reductant having high reactivity and generating few gaseous sulfur compounds can be obtained, and besides that the amount of alkaline earth metal compound in the agglomerates can be easily changed. This makes it possible to regulate the reactivity and besides to determine the optimum amount of alkaline earth metal compound according to the sulfur content of solid reductant, especially petroleum coke.

What is claimed is:

1. In a method for producing a reactivity promoted carbonaceous solid reductant for use in the direct reduction of iron ore, wherein the carbonaceous solid is incorporated with an additional alkaline earth metal compound, the improvement comprising, grinding and mixing the carbonaceous solid reductant with the alkaline earth metal compound and agglomerating the resulting mixture to produce the reactivity promoted carbonaceous solid reductant of a definite grain size, and having a Boudouard reactivity of above 80%.

2. The improvement according to claim 1, wherein the carbonaceous solid reductant is petroleum coke.

3. The improvement according to claim 1, wherein the alkaline earth metal compound is a calcium compound or a barium compound.

4. The improvement according to claim 3, wherein the calcium compound is quick lime or limestone.

5. The improvement according to claim 3, wherein the barium compound is barium hydroxide.

* * * * *